(12) United States Patent
Wendinger et al.

(10) Patent No.: US 9,162,602 B2
(45) Date of Patent: Oct. 20, 2015

(54) APPARATUS CONFIGURABLE INTO RAMP OR BARRIER

(71) Applicant: Nicholas A. Gargaro, III, Lino Lakes, MN (US)

(72) Inventors: David M. Wendinger, Isanti, MN (US); Nicholas A. Gargaro, III, Coon Rapids, MN (US)

(73) Assignee: Nicholas A. Gargaro, III, Coon Rapids, MN (US)

( * ) Notice: Subject to any disclaimer, the term of this patent is extended or adjusted under 35 U.S.C. 154(b) by 0 days.

(21) Appl. No.: 14/068,764

(22) Filed: Oct. 31, 2013

(65) Prior Publication Data

US 2014/0125082 A1 May 8, 2014

Related U.S. Application Data

(60) Provisional application No. 61/722,579, filed on Nov. 5, 2012.

(51) Int. Cl.
*B60P 1/43* (2006.01)

(52) U.S. Cl.
CPC ...................... *B60P 1/435* (2013.01)

(58) Field of Classification Search
CPC ............ B60P 1/435; B60P 1/43; B65G 69/30
USPC ............. 296/26.01, 26.08, 37.6, 37.1, 61, 62; 414/537

See application file for complete search history.

(56) References Cited

U.S. PATENT DOCUMENTS

| 4,596,417 | A | 6/1986 | Bennett | |
|---|---|---|---|---|
| 6,158,797 | A | 12/2000 | Bauer | |
| 6,227,593 | B1* | 5/2001 | De Valcourt | 296/26.08 |
| 6,322,125 | B2 | 11/2001 | Bauer | |
| 6,435,588 | B1 | 8/2002 | Bauer | |
| 6,616,208 | B1 | 9/2003 | Bauer | |
| 6,764,121 | B1 | 7/2004 | Bauer | |
| 6,948,755 | B1 | 9/2005 | Bauer | |
| 7,121,607 | B2* | 10/2006 | Bauer | 296/37.6 |
| 2001/0005085 | A1 | 6/2001 | Bauer | |
| 2006/0076794 | A1 | 4/2006 | Bauer | |

* cited by examiner

*Primary Examiner* — Joseph D Pape
*Assistant Examiner* — Dana Ivey

(57) ABSTRACT

A first barrier and a second barrier that, in a C-shape configuration, lay one on top of the other and engage each other and that, in an arched configuration, lay separate and disengaged from each other. In the C-shape configuration, the barriers can close off the bed of a pickup truck such as when the tailgate of the pickup truck is laid out and open. In the arched configuration, the barriers can serve as a four wheel vehicle ramp that extends from the ground up to the open, horizontally extending tailgate.

15 Claims, 8 Drawing Sheets

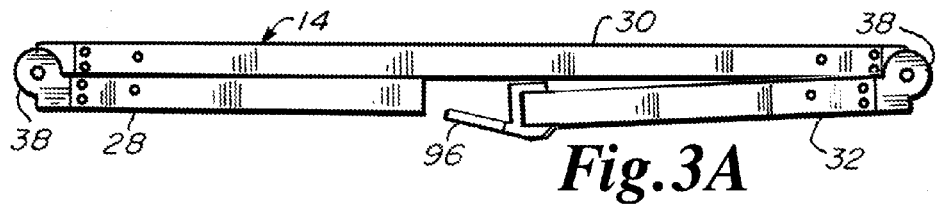
*Fig.3A*
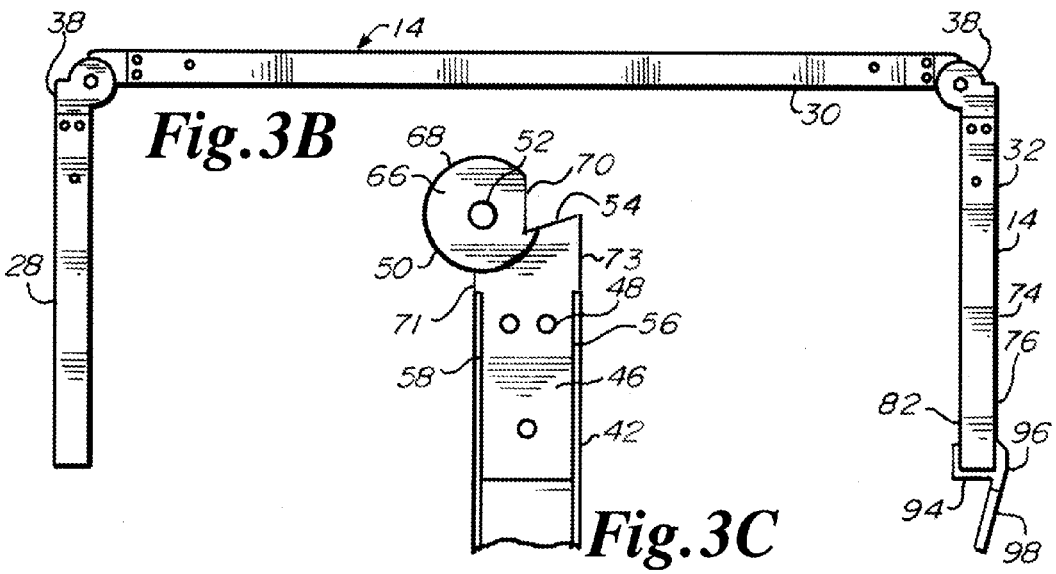
*Fig.3B*
*Fig.3C*
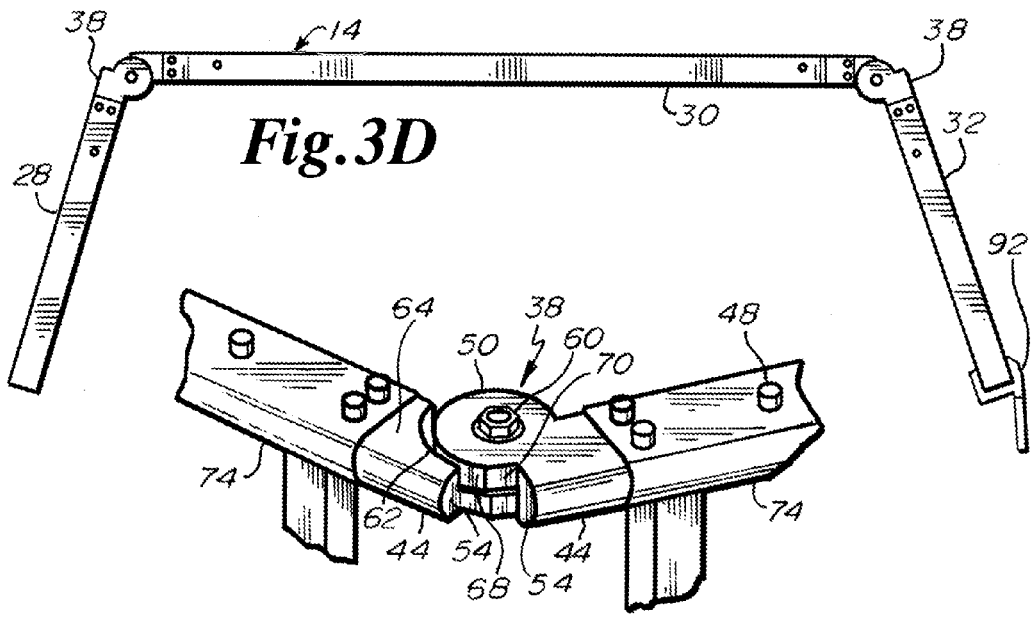
*Fig.3D*
*Fig.3E*

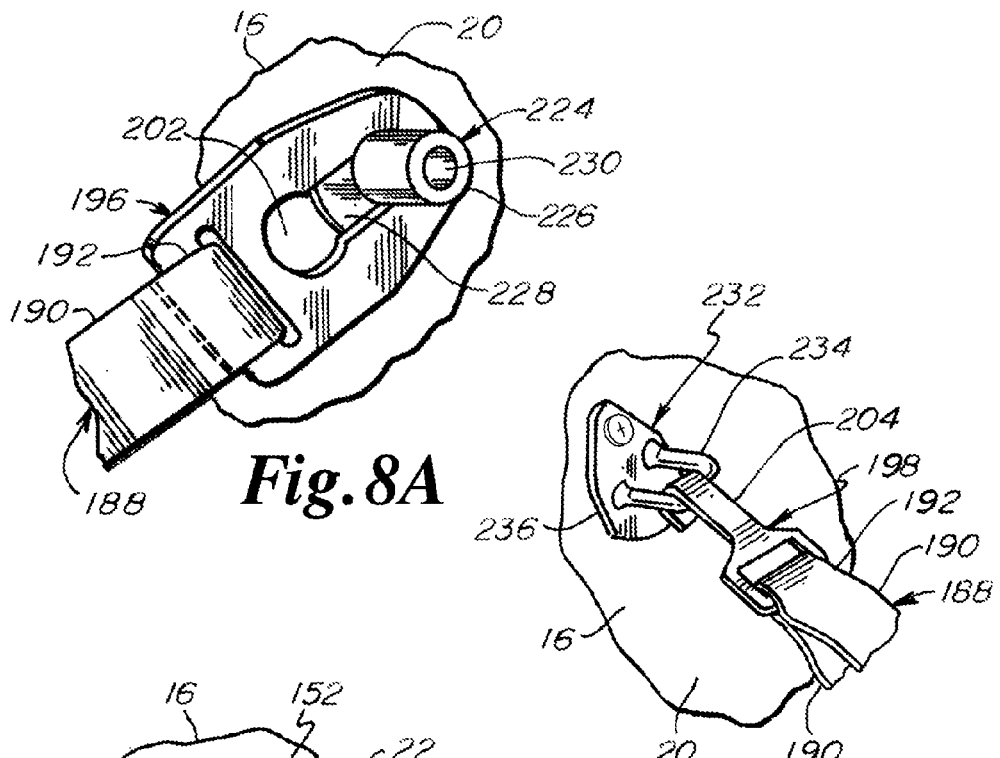
*Fig.8A*
*Fig.8B*
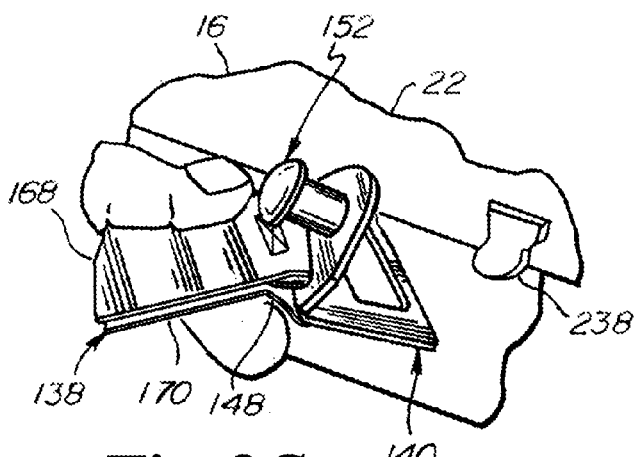
*Fig.8C*
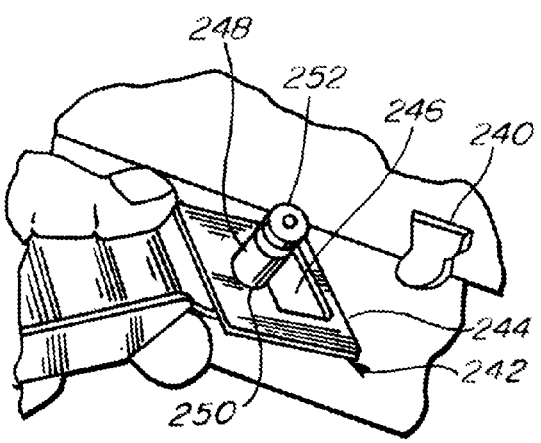
*Fig.8D*

APPARATUS CONFIGURABLE INTO RAMP OR BARRIER

This application claims the benefit under 35 U.S.C. 119(e) of U.S. Provisional Patent Application No. 61/722,579 filed Nov. 5, 2012, which is hereby incorporated by reference in its entirety into this application.

FIELD OF THE INVENTION

The present invention generally relates to an apparatus having a barrier configuration and a ramp configuration, particularly relates to a ramp configuration for driving a four wheel vehicle onto the bed of a pickup truck, and also particularly relates to a barrier configuration that closes off the bed of a pickup truck when the tailgate of the pickup truck is laid out horizontally.

BACKGROUND OF THE INVENTION

The Bauer U.S. Pat. No. 6,435,588 is entitled Truck Bed Extension. It discloses a truck bed extension that is convertible into a pair of ramps. The truck bed extension includes a left truck bed extension and a right truck bed extension, each truck bed extension including a back wall section, a side wall extension section and a ramp lip. The side wall extension, ramp lip and back wall section are hinged together to allow the truck bed extension to be straightened when detached from the truck bed and used as a dual ramp.

SUMMARY OF THE INVENTION

A feature of the present invention is a tailgate high structure that effectively extends the bed of a pickup truck, where the pickup truck has a bed, a tailgate, and two opposing walls, the tailgate having first connectors, and the opposing walls having second connectors that engage the first connectors to engage the tailgate to the opposing walls.

Another feature of the present invention is the provision in such a tailgate high structure, of first and second barriers, of each of the first and second barriers including at least three units, the at least three units including proximal, intermediate and distal units, and of the intermediate unit being pivotally engaged to each of the proximal and distal units.

Another feature of the present invention is the provision in such a tailgate high structure, of each of the units including a length, a width, a height, a top, a bottom, a first face, a second face, a first end, and a second end, the height of the unit being defined by a distance from the top to the bottom, the width of the first unit being defined by a distance from the first face to the second face, and a length of the first unit being defined as a distance from the first end to the second end.

Another feature of the present invention is the provision in such a tailgate high structure, of each of the first and second barriers being configurable into a C-shape and into a ramp shape.

Another feature of the present invention is the provision in such a tailgate high structure, of each of the units of each of the first and second barriers being disposed generally in a plane, the first and second barriers being engagable to each other such that the proximal units are disposable in generally a common plane, such that the intermediate units are disposable in generally a common plane, and such that the distal units are disposable in generally a common plane.

Another feature of the present invention is the provision in such a tailgate high structure, of the bottom of one proximal unit being engaged to the top of the other proximal unit, of the bottom of one intermediate unit being engaged to the top of the other intermediate unit, and of the bottom of one distal unit being engaged to the top of the other distal unit.

Another feature of the present invention is the provision in such a tailgate high structure, of at least one of the first and second barriers when engaged to each other being further engaged to at least one of the first and second connectors to engage the first and second barriers to the pickup truck.

Another feature of the present invention is the provision in such a tailgate high structure, of the first and second barriers when engaged to each other and when in the C-shape being disposable at least partially on the tailgate such that the bed of the pickup truck is extended.

Another feature of the present invention is the provision in such a tailgate high structure, of the proximal and distal units of the first and second barriers being adjacent to the opposing walls of the pickup truck and being disposed forwardly of the intermediate units of the first and second barriers, and of the intermediate units crossing between the proximal and distal units to replace the tailgate that lays flat.

Another feature of the present invention is the provision in such a tailgate high structure, of each of the at least three first and second units of each of the first and second barriers including through spaces running from the first face to the second face to permit air to pass through the first and second barriers to minimize wind resistance when the pickup truck is being driven.

Another feature of the present invention is the provision in such a tailgate high structure, of each of the first and second barriers being configurable into the C-shape where the proximal and distal units oppose each other, and of each of the first and second barriers being configurable into the ramp shape, the ramp shape being a shape where an angle between the proximal and intermediate units is present and where an angle between the intermediate and distal units is present such that the ramp configuration takes an arched form.

Another feature of the present invention is the provision in such a tailgate high structure, of each of the first and second barriers being configurable into the C-shape where the proximal and distal units oppose each other and run obliquely relative to the intermediate unit, and of each of the first and second barriers being configurable into the ramp shape, the ramp shape being a shape where an angle between the proximal and intermediate units is present and where an angle between the intermediate and distal units is present such that the ramp configuration takes an arched form.

Another feature of the present invention is the provision in such a tailgate high structure, of each of the first and second barriers being configurable into the C-shape where the proximal and distal units oppose each other and run at a right angle relative to the intermediate unit, and of each of the first and second barriers being configurable into the ramp shape, the ramp shape being a shape where an angle between the proximal and intermediate units is present and where an angle between the intermediate and distal units is present such that the ramp configuration takes an arched form.

Another feature of the present invention is the provision in such a tailgate high structure, of each of the first and second barriers being configurable into a folded compact form, the folded compact form being a form where a face of the proximal unit lays adjacent to a face of the intermediate unit, where a face of the distal unit lays adjacent to a face of the intermediate unit, and where a free end of the proximal unit opposes a free end of the distal unit.

Another feature of the present invention is the provision in such a tailgate high structure, of one of the first and second barriers including a male component, of the other of the first and second barriers including a female component, and of the male component engaging the female component when the bottoms of the units of one of the first and second barriers engage the tops of the units of the other of the first and second barriers.

Another feature of the present invention is the provision in such a tailgate high structure, of each of the units of each of the first and second barriers including either the male component or the female component.

Another feature of the present invention is the provision in such a tailgate high structure, of at least one of the first and second barriers being engaged to one of the first and second connectors by a first strap, of at least one of the first and second barriers being engaged to another of the first and second connectors by a second strap, of at least one of the first and second barriers being engaged to still another of the first and second connectors by a third strap, and of at least one of the first and second barriers being engaged to yet another of the first and second connectors by a fourth strap.

Another feature of the present invention is the provision in such a tailgate high structure, of each of the units of each of the first and second barriers including a pair of longitudinal support members and a set of cross members extending between the longitudinal support members, of the cross members extending horizontally when the structure is employed in a ramp configuration, and of the cross members extending vertically and being vertically aligned with another cross member when the structure is employed as a barrier.

Another feature of the present invention is the provision in such a tailgate high structure, of at least one of the first and second barriers being engaged to the first connector by a first strap, of the first strap having a first connection that engages the first connector, of the first strap having a second connection that does not engage the first connector of a particular pickup truck but engages the first connector of a different pickup truck, and of the first and second connections being adjacent to each other.

Another feature of the present invention is the provision in such a tailgate high structure, of at least one of the first and second barriers being engaged to the second connector by a first strap, of the first strap having a first connection that engages the second connector, of the first strap having a second connection that does not engage the second connector of a particular pickup truck but engages the second connector of a different pickup truck, and of the first and second connections being adjacent to each other.

Another feature of the present invention is the provision in such a tailgate high structure, of at least one of the first and second barriers being engaged to the first connector by a strap mechanism, of the strap mechanism including two strap sections that form a V-shape, and of the V-shape stemming from the first connector and extending to different portions of the first and second barriers.

An advantage of the present invention is that the apparatus, when in the barrier configuration, is about the height of a tailgate to thereby maximize safety when transporting massive objects such as all terrain vehicles.

Another advantage of the present invention is that the apparatus, when in the barrier configuration, is about the height of the opposing walls of the rear bed of a pickup truck to thereby maximize safety when transporting massive objects such as all terrain vehicles.

Another advantage of the present invention is that the apparatus includes three different configurations: a barrier configuration that is employed on the extended bed of a pickup truck, a ramp configuration that provides a pair of ramps from the ground to the extended bed of a pickup truck, and a stow configuration where the apparatus is folded for storage and occupies a minimum amount of space.

Another advantage of the present invention is that the barrier configuration may be quickly and easily set up from either the ramp configuration or the stow configuration.

Another advantage of the present invention is that the ramp apparatus may be quickly and easily set up from either the barrier configuration or the stow configuration.

Another advantage of the present invention is that the stow configuration may be quickly and easily attained from either the barrier configuration or the ramp configuration.

Another advantage of the present invention is that the apparatus, when in the barrier configuration, is easy on gas and maximizes fuel efficiency because the apparatus is constructed of aircraft aluminum and is therefore relatively light, weighing about 38 pounds, and because the apparatus includes through openings to maximize the passage of air and minimize turbulence.

Another advantage of the present invention is that the apparatus, when in the ramp configuration, takes on the shape of an arch for added clearance.

Another advantage of the present invention is that the apparatus, when in the ramp configuration, is strong. The ramp configuration is rated at a load capacity of 1500 pounds.

Another advantage of the present invention is that the apparatus, when in the barrier configuration, extends the bed of either a mid-size pickup truck or a full size pickup truck.

Another advantage is the apparatus, when in the ramp configuration, can be used any four wheel vehicles and two wheel vehicles such as motorcycles.

BRIEF DESCRIPTION OF THE DRAWINGS

FIG. 3A is a top view of the apparatus of FIG. 1A in a stow configuration, and shows the three units running generally parallel to each other.

FIG. 3B is a top view of the apparatus of FIG. 1A showing the apparatus in the barrier configuration where two of the units run at a right angle to the intermediate unit.

FIG. 3C is a top, detail view of a junction between the intermediate unit and one adjacent unit of the apparatus of FIG. 1A.

FIG. 3D is a top view of the apparatus of FIG. 1A showing the apparatus in the barrier configuration where two of the units run at an oblique angle to the intermediate unit.

FIG. 3E is a perspective top, detail view of a junction between the intermediate unit and one adjacent unit of the apparatus of FIG. 1A.

FIG. 8A is perspective, detail view of a portion of the strap mechanism of FIG. 6B connected to a wall connection of a pickup truck.

FIG. 8B is a perspective, detail view of a portion of the strap mechanism of FIG. 6B connected to a wall connection of a pickup truck.

FIG. 8C is a perspective, detail view of a portion of a strap mechanism of FIG. 6A about to be connected into a tailgate connection of a pickup truck.

FIG. 8D is a perspective, detail view of a portion of an alternate connector for the strap mechanism of FIG. 6A.

DETAILED DESCRIPTION

Figure 1A:
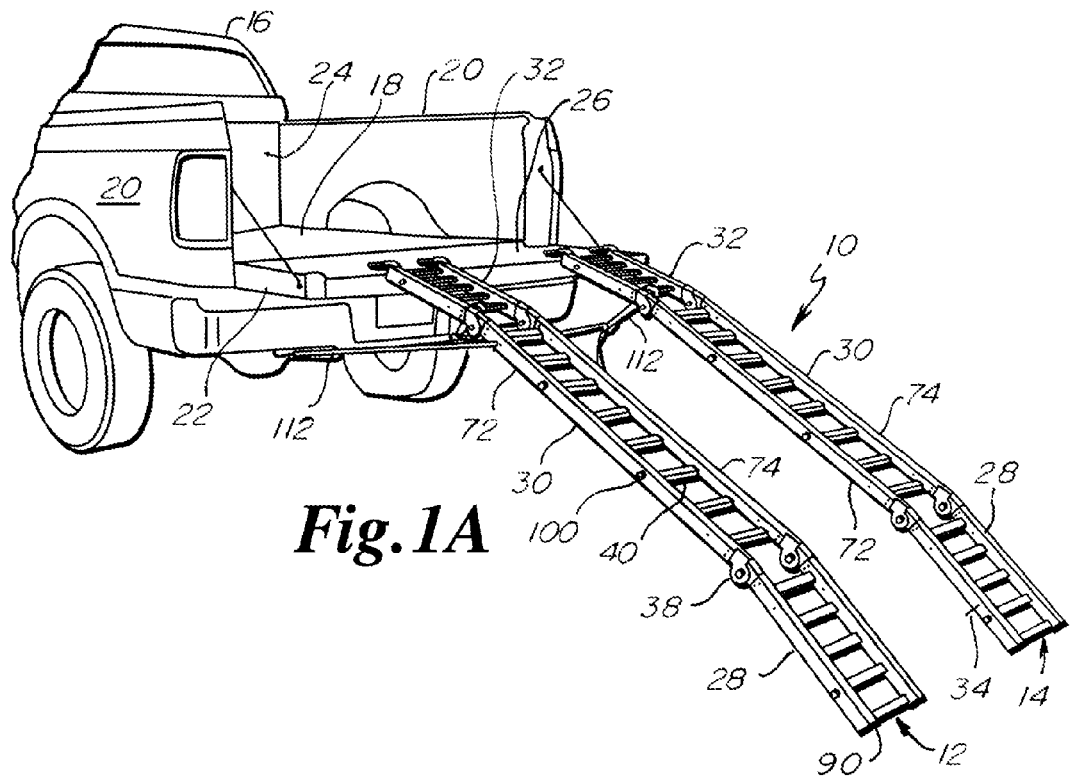
FIG. 1A is a perspective rear view of the present apparatus having a ramp configuration that includes two ramps leading into a laid out tailgate of a pickup truck and shows that each of the ramps includes three units in an arched form.
Figure 2A:
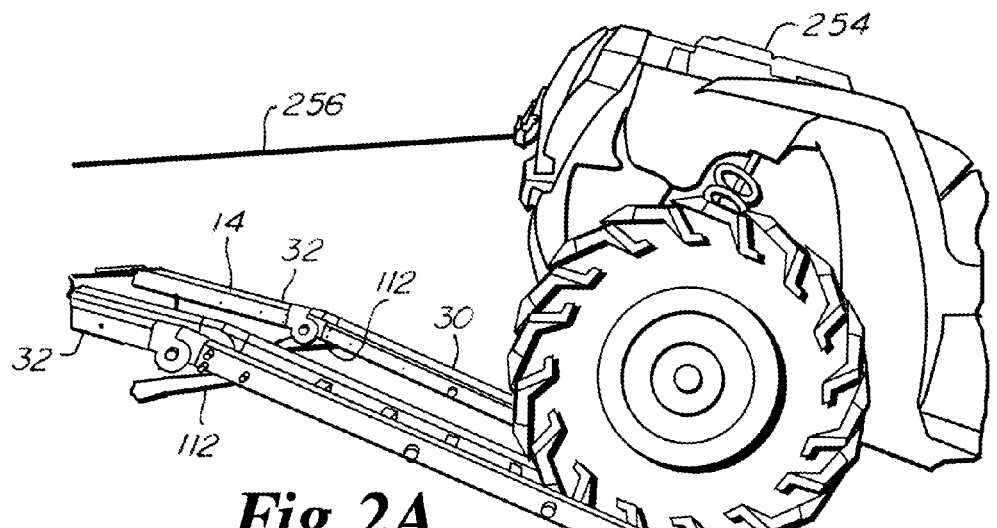
FIG. 2A is a perspective, detail view of the apparatus of FIG. 1B showing a four wheel vehicle partially on the apparatus in the ramp configuration, and shows the three units of each of the ramps in an arched form.
Figure 2B:
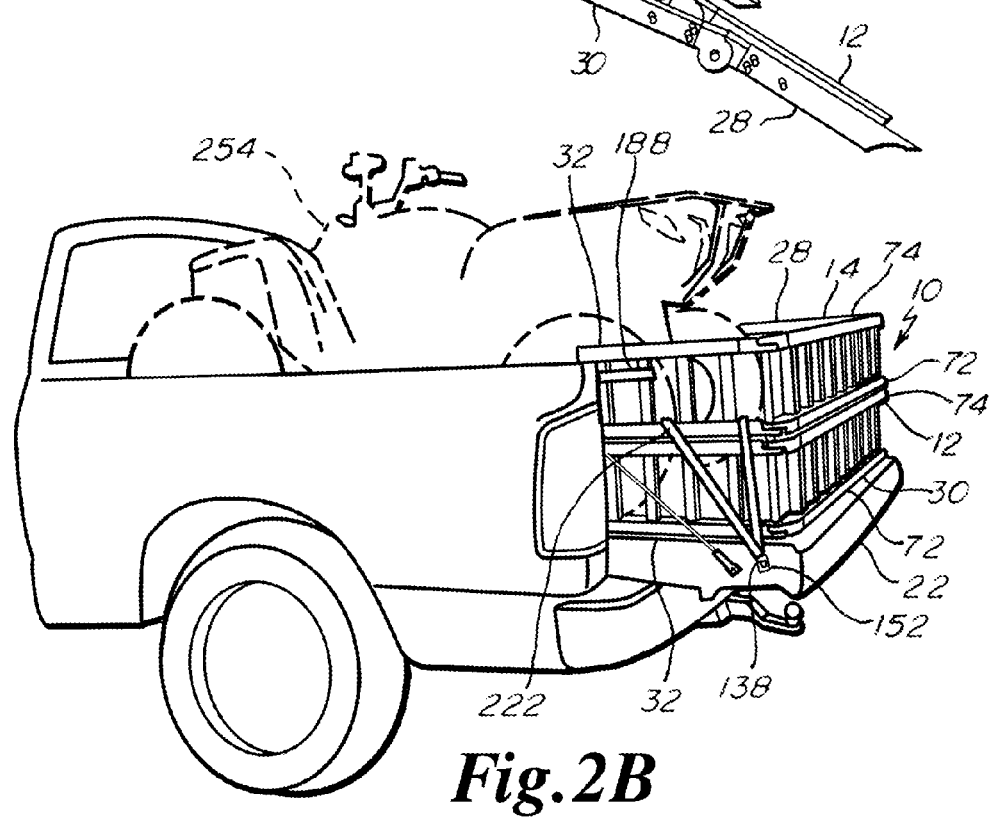
FIG. 2B is a perspective side view of the apparatus of FIG. 1A in a barrier configuration prior to employment of the straps to engage the barrier apparatus to the pickup truck, and shows the three units of each of the barriers in a C-shape form.

FIG. 1A shows the present apparatus 10 in a ramp configuration. FIG. 2B shows the present apparatus 10 in a barrier configuration.

Apparatus 10 includes a first ramp or barrier or apparatus section 12 and a second ramp or barrier or apparatus section 14. Ramps 12, 14 extend from the ground to a pickup truck 16. Pickup truck 16 includes a bed or floor 18 between two opposing sidewalls 20. Pickup truck 16 further includes a tailgate 22. Besides being bounded by opposing sidewalls 20, bed 18 is bounded by tailgate 22 and a front wall 24. Tailgate 22 includes a surface 26 that is vertically disposed when the tailgate 22 is in an upright position. Surface 26 is in a horizontal position when the tailgate 22 is laid out as shown in FIG. 1A. When the tailgate 22 is laid out horizontally as in FIG. 1A, surface 26 is generally flush with the bed 18 and effectively extends the length of the bed 18. When the tailgate 22 is upright, tailgate 22 and surface 26 are about the height of each of the opposing sidewalls 20.

As shown in FIG. 1A, each of the ramps 12, 14 includes a proximal end unit 28, an intermediate unit 30 and a distal end unit 32. Each of the ramps 12, 14 is identical except that ramp 14 includes alignment pins or male members 34 that are inserted into alignment openings or female members 36 formed in ramp 12, shown in FIG. 4A. The male and female members 34, 36 provide for stacking of barrier 14 on barrier 12 when the apparatus 10 is in the barrier configuration on the pickup truck 16.

As shown in FIG. 1A, each of the ramps 12, 14 includes a set of four junctions 38. The junctions 38 provide for the proximal end unit 28 to pivot relative to the intermediate unit 30 and for the intermediate unit 30 to pivot relative to the distal end unit 32.

As shown in FIG. 1A, each of the ramps 12, 14 includes a set of rungs or lateral support members or cross members 40 that tie two longitudinal support members 42 together. Each of the rungs 40 is tubular. Each of the longitudinal support members 42 is tubular.

As shown in FIGS. 3C and 3E, junction 38 includes two junction sections 44. The junction sections 44 are identical to each other. Junction section 44 is formed of a solid metal such as stainless steel. Junction section 44 includes an insert portion 46 that slips inside of a tubular end of a tubular longitudinal member 42. The insert portion 46 is engaged to the tubular end of the tubular longitudinal member 42 by three removable pins 48 extending through each of the insert portion 46 and tubular end of the tubular longitudinal member 42.

Junction section 44 further includes a disk portion 50. Disk portion 50 has a thickness that is about one-half of the thickness of insert portion 46, where thickness is a direction defined by the direction that the removable pins 48 run. Insert portion 46 can be defined to have a longitudinal axis running centrally through the insert portion 46. Disk portion 50 can be defined to have a pin opening 52 running laterally and centrally through disk portion 50. Pin opening 52 is offset from the longitudinal axis of the insert portion 46. On the opposite side of the longitudinal axis of the insert portion 46, opposite of the pin opening 52, is a stop 54. Stop 54, like the insert portion 46, has a thickness that is twice that of the disk portion 50. Stop 54 is disposed at an acute angle relative to edges 56, 73 of the insert portion 46. Insert portion 46 further includes a second edge 58 running parallel to edge 56. Insert edges 56, 58 are spaced apart in a width direction. Second edge 58 can be defined by a straight line, which straight line intersects the center of pin opening 52. Adjoining junction sections 44 are engaged to each other by a removable pin 60.

Figure 4A:
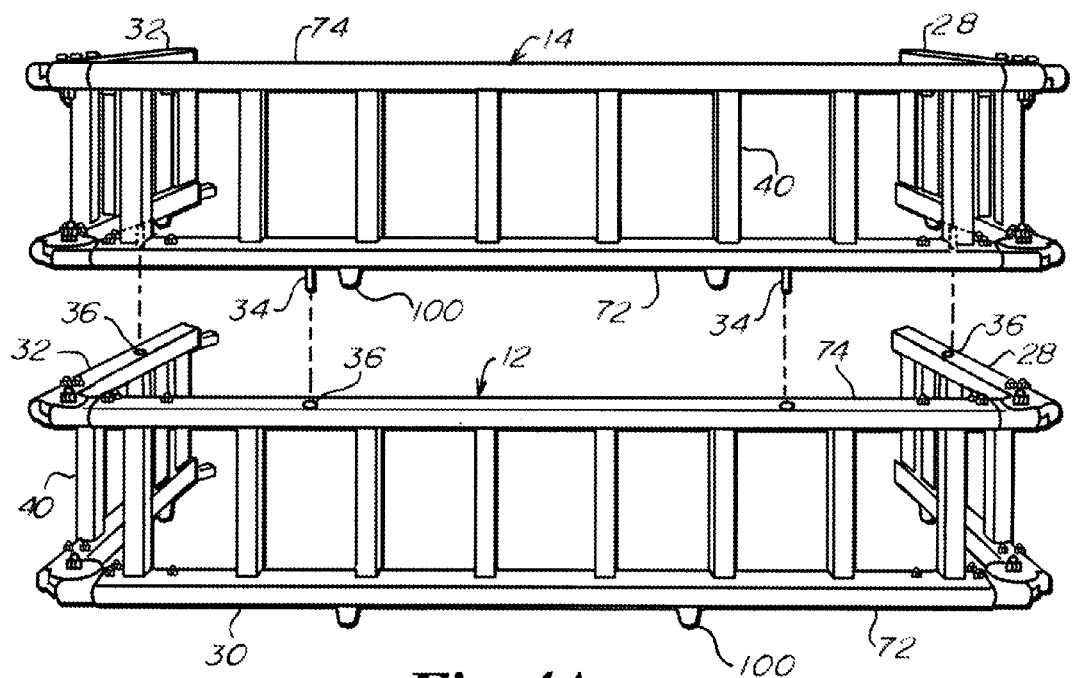
FIG. 4A is a perspective rear view of the apparatus of FIG. 1A being set up into the barrier configuration.
Figure 4B:
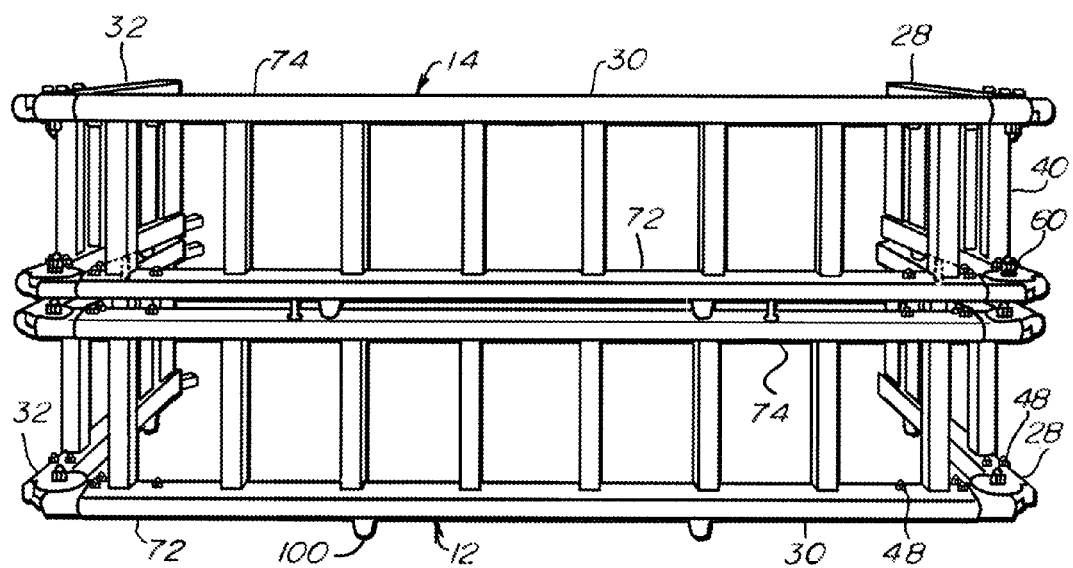
FIG. 4B is a perspective rear view of the apparatus of FIG. 4A having been set up in the barrier configuration.

As shown in FIG. 4B, pins 48 and 60 include heads and nuts such that pins 48 and 60 are removable. By removing pins 48 and 60, junctions 38 are replaceable.

Since stop 54 is disposed at an acute angle (where an acute angle is defined by an angle less than 90 degrees) relative to straight edges 56, 73, straight edges 56, 73 of two adjoining junction sections 44 are not aligned with each other (are not on the same straight line). Instead, these straight edges 56, 73 of two adjoining junction sections 44 will lie at an obtuse or oblique angle relative to each other, where oblique means an angle that is not a multiple of 90 degrees and where obtuse means an angle between 90 degrees and 180 degrees. It should be noted that if stop 54 is disposed at a right angle relative to straight edges 56, 73, then straight edges 56, 73 of two adjoining junction sections 44 would be aligned with each other (would lie on the same straight line).

Insert portion 46 includes a section inside and outside of longitudinal support members 72, 74. An endless ridge 71 separates these inside and outside sections of the insert portion 46. The outside section of the insert portion 46 includes a curved wall 62 disposed between a face 64 of insert portion 64 and an inner face 66 of the disk portion 50. Curved wall 62 confronts a sidewall 68 of the disk portion 50 of the adjoining junction section 44.

Edge 73 of the outside section of insert portion 46 is a top edge of junction section 44 when apparatus 10 is set up as a ramp. These top edges 73 of the junction section 44 terminate at the stops 54. Stops 54 of adjoining junction sections 44 hit each other to provide an arched form to each of the ramps 12, 14 as shown in FIG. 1A. Preferably, the angle between the face forming stop 54 and straight edge 73 is formed so as to provide a 12 degree angle between straight top edges 73 of adjoining junction sections 44 when the stops 54 of adjoining junction sections 44 hit each other and stop the pivoting motion of adjacent units. It should be noted that the angle between the face of stop 54 and straight top edge 73 may be exaggerated in FIG. 3C.

When the stops 54 make contact with each other, the entire face of one stop 54 preferably makes contact with the entire face of the other stop 54. By making such full contact, wear and tear on the stops 54 is minimized.

To provide space for the stops 54, to permit the stops 54 to make contact with each other and to increase the surface area of contact between the stops 54, each of the disk portions 50 includes a cutout 70. Cutout 70 includes a face that lies in a plane that is parallel to or on the longitudinal axis of insert portion 46.

The curved wall 62 is spaced from the curved sidewall of disk portion 50. Junctions 38 pivot and are limited in their swinging motion by a friction fit between opposing and adjacent inside faces 66.

The proximal, intermediate, and distal units 28, 30, and 32 define first, second and third planes, respectively. An angle between the first and second planes is defined as a first angle. An angle between the second and third planes is defined as a second angle. When apparatus 10 is in the ramp configuration, each of the first and second angles is preferably between about 5 to about 20 degrees, more preferably between about 7 and about 17 degrees, yet more preferably between about 10 and about 14 degrees, still more preferably between about 11 and about 13 degrees, and most preferably at about 12 degrees.

Each of the units 28, 30, and 32 includes a pair of longitudinally extending tubular support members 72, 74. Members 72 are bottom members 72 when the apparatus 10 is in the barrier configuration. Members 74 are top members 74 when the apparatus 10 is in the barrier configuration.

Figure 7A:
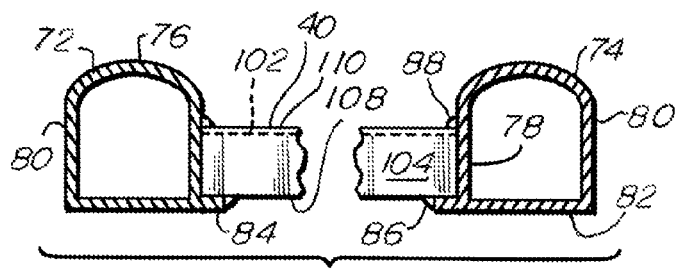
FIG. 7A is a cross section of any of the proximal, intermediate, or distal units of the apparatus of FIG. 1A.

As shown in FIG. 7A, each of the support members 72, 74 includes a curved top 76, a straight inner wall 78, a straight outer wall 80, and a straight floor 82. Top 76, inner wall 78, outer wall 80, and floor 82 are integral and one piece. Optionally, top 76 and walls 78, 80 can be one-piece and integral and floor 82 can be welded, or engaged in another manner, to walls 78, 80. Floor 82 runs from outer wall 80 to a location beyond and inwardly of inner wall 78. This additional length that is provided to floor 82 provides a ledge or platform 84 for rung 40. Rung 40 is welded to longitudinal support members 72, 74 by a first weld 86 between the ledge 84 and the bottom of the rung 40 and by a second weld 88 between the rung 40 and an upper portion of rung 40. This upper portion 40 includes the upper plate portion of the rung 40 and the two side plate portions of the rung 40.

The interior section of insert portion 46 slides like a glove into the distal ends of proximal unit 28, into both ends of intermediate unit 30, and into the proximal ends of distal unit 32. The interior section of insert portion 46 includes a shape that matches or mates with the inner portions of curved top 76, straight or flat inner wall 78, straight or flat outer wall 80 and straight or flat floor 82. The exterior section of insert portion 46 is separated from the interior section of the insert portion 46 by endless ridge 71. The exterior section of insert portion 46 further includes a cross section that includes a curved top, flat inner and outer walls, and a flat floor such that the outer section of the insert portion 46 is flush with the exterior surfaces of longitudinal support members 72, 74. This exterior section of insert portion 46 then transitions into the disk portion 50.

Longitudinal support members 72, 72 and rung 40 are formed of a relatively light metal. A preferred metal is an aluminum alloy or aluminium alloy. A preferred aluminum is an aircraft aluminum. Aircraft aluminum includes the following aluminum or aluminium alloys: 7068 aluminium, 7075 aluminium, 6061 aluminium, 6063 aluminium, 2024 aluminium, 5052 aluminium. 7075 aluminium is preferred. Aircraft aluminium or aerospace aluminium commonly refers to 7075 aluminium.

Each of the longitudinal support members 72, 74 of proximal unit 28 includes a proximal end that is closed off by a plastic insert. This plastic insert 90 may be engaged to this proximal end by a rivet extending through floor 82 of the members 72, 74.

Each of the longitudinal support members 72, 74 of proximal unit 28 includes a distal end. Received in this distal end is the insert portion 46 of the junction section 44.

Between the proximal and distal ends of longitudinal support members 72, 74, proximal unit 28 includes five rungs 40. The proximal rung 40 crosses between the support members 72, 74 adjacent to the proximal end of unit 28. The distal rung 40 crosses between the support members 72, 74 at a location spaced from the distal end of proximal unit 28.

Each of the longitudinal support members 72, 74 of intermediate unit 30 includes a proximal end that is closed off by junction section 44.

Each of the longitudinal support members 72, 74 of intermediate unit 30 includes a distal end that is closed off by junction section 44.

Between the proximal and distal ends of longitudinal support members 72, 74, intermediate unit 30 includes eight rungs 40. The proximal rung 40 crosses between support members 72, 74 at a location spaced from the proximal end of intermediate unit 30. The distal rung 40 crosses between support members 72, 74 at a location spaced from the distal end of intermediate unit 30.

Each of the longitudinal support members 72, 74 of distal unit 32 includes a proximal end that is closed off by junction section 44.

Each of the longitudinal support members 72, 74 of distal unit 32 includes a distal end that is closed off by a piece 92. Piece 92 includes a U-shaped portion 94 and a lever portion or straight bar portion 96. U-shaped portion 94 and straight bar portion 96 are one-piece and integral with each other. U-shaped portion 94 is welded to the top curved portion 76 and the floor portion 82 of support members 72, 74 so as to close off the distal ends of support members 72, 74 of distal unit 32. Straight portion 96 extends obliquely relative to distal unit 32 as a whole such that, when straight bar portion 96 is placed upon the surface 26 of the swung down tailgate 22, distal unit 32 extends at a downward angle relative to the swung down tailgate 22. From the top view shown in FIG. 3B, piece 92 forms the shape of a lower case "h." A plastic, elastomeric, rubber or rubber-like cap 98 is placed over a portion of the straight bar portion 96 to minimize any marring or marking of the surface 26 of the tailgate 22. It can be appreciated that apparatus 10 has a total of four pieces 92. Piece 92, like junction section 44, is formed of solid metal such as a steel or hardened steel or stainless steel.

The rungs or cross members 40 of the proximal, intermediate and distal units 28, 30 and 32 provide through spaces for the apparatus 10. When the apparatus 10 is used in the barrier configuration, the through spaces permit air to readily pass through to minimize turbulence such as turbulence that is caused by the conventional solid tailgate 22 when the tailgate is in an upright position.

As shown in FIG. 4A, alignment holes 36 are formed in outer walls 80 of support members 74 of each of the units 28, 30, 32 of ramp or barrier 12. Proximal unit 28 includes one alignment hole 36, which alignment hole 36 is disposed adjacent to the middle rung 40 of proximal unit 28. Intermediate unit 30 includes two alignment holes 36, the first of which is located intermediate the second and third rungs 40 and the second of which is located between the sixth and seventh rungs 40. Distal unit 32 includes one alignment hole 36, which alignment hole 36 is located adjacent to the middle rung 40 of distal unit 32.

As shown in FIG. 4A, alignment pins 34 extend from outer walls 80 of support members 72 of each of the units 28, 30, 32 of ramp or barrier 14. Proximal unit 28 includes one alignment pin 34, which alignment pin 34 is disposed adjacent to the middle rung 40 of proximal unit 28. Intermediate unit 30 includes two alignment pins 34, the first of which is located intermediate the second and third rungs 40 and the second of which is located between the sixth and seventh rungs 40. Distal unit 32 includes one alignment pin 34, which alignment pin 34 is located adjacent to the middle rung 40 of distal unit 32. Alignment pins 34 are received in their respective alignment holes 36 to minimize longitudinal and lateral movement of the barriers 12, 14 relative to each other when apparatus 10 is in the barrier configuration.

Figure 5A:
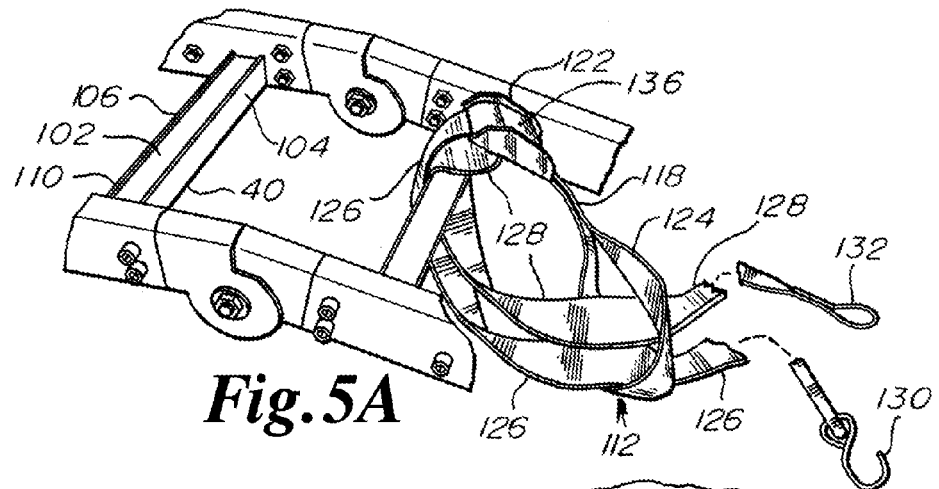
FIG. 5A is a perspective, detail view of a strap mechanism for the apparatus of FIG. 1A in the ramp configuration.
Figure 5B:
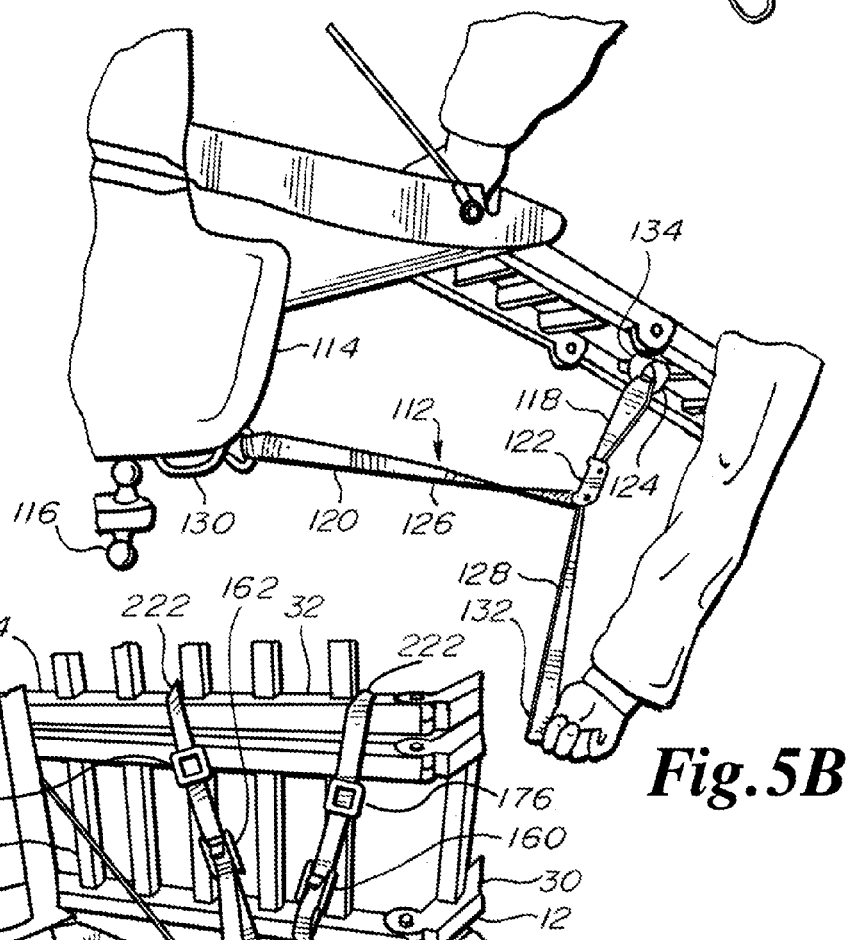
FIG. 5B is a perspective detail view of the strap mechanism of FIG. 5A engaging the rear bumper of a pickup truck and further engaging the apparatus of FIG. 1A in the ramp configuration.
Figure 5C:
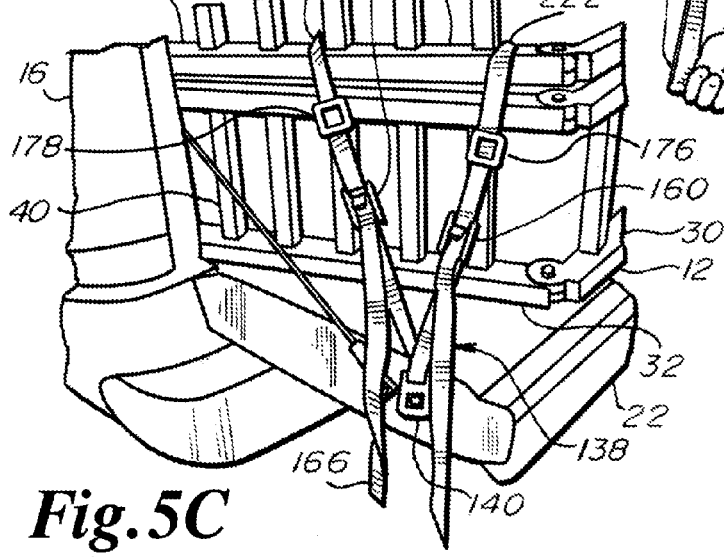
FIG. 5C is a perspective side view of the apparatus of FIG. 1A in the barrier configuration and shows strap mechanisms for engaging the apparatus to a wall connection and to a tailgate connection.

As shown in FIGS. 2B, 4B, and 5C, when upper barrier 14 is placed on top of lower barrier 12, the rungs or cross members 40 of the upper barrier 14 are vertically aligned with the rungs or cross members 40 of the lower barrier 12. The bumpers 100 of the upper and lower barriers 12, 14 are not so vertically aligned, as discussed below.

Each of the barriers 12, 14 includes resilient feet or bumpers 100. Bumper 100 can be formed of a plastic or elastomeric or rubber or rubber-like material. The bumpers 100 are engaged to and extend from the outer wall 80 of support members 72.

Proximal unit 28 of barrier 12 includes a single bumper 100 that is offset from and adjacent to the second rung 40, while proximal unit 28 of barrier 14 includes a single bumper 100 located laterally of second rung 40, such that the bumpers 100 of proximal units 28 are not aligned laterally (and thus are not aligned in the height direction when apparatus 10 is in the barrier configuration).

Each of the intermediate units 30 includes first and second bumpers 100. The first bumper 100 of barrier 12 is located between the third and fourth rungs, while the first bumper 100 of barrier 14 is offset from and adjacent to the third rung 40, such that the first bumpers 100 of intermediate units 30 are not aligned laterally (and thus are not aligned in the height direction when apparatus 10 is in the barrier configuration). The second bumper 100 of barrier 12 is offset and adjacent to the sixth run 40, while the second bumper 100 of barrier 14 is further offset from (but still adjacent to) the sixth rung 40, such that the second bumpers 100 are not aligned laterally (and thus are not aligned in the height direction when apparatus 10 is in the barrier configuration).

Distal unit 32 of barrier 12 includes a single bumper 100 that is offset from and adjacent to the fourth rung 40, while distal unit 32 of barrier 14 includes a single bumper 100 located laterally of fourth rung 40, such that the bumpers 100 of distal units 32 are not aligned laterally (and thus are not aligned in the height direction when apparatus 10 is in the barrier configuration).

Bumpers 100 of bottom barrier 12 space the bottom barrier 12 from the swung down tailgate 22 to isolate the apparatus 10 as a whole from vibrations of the tailgate 22 and to minimize marring and marking of the surface 26 of tailgate 22. Bumpers 100 of the top barrier 14 space the top barrier 14 from the bottom barrier 12 to isolate the top barrier 14 from vibrations of the bottom barrier 12 and to isolate the bottom barrier 12 from vibrations that may travel to and through the top barrier 14 from the walls 20 of pickup truck 16.

Rung 40 is formed by four plates or sections 102, 104, 106 and 108. When apparatus 10 is in the ramp configuration, plate 102 is an upper plate, plate 104 is a proximal side plate, plate 106 is a distal side plate, and plate 108 is a bottom plate. Side plates 104, 106 project upwardly and beyond the surface of the upper plate 102 to provide two ridges or blade like projections 110 per rung 40 to provide a roughened surface and maximize traction for the wheels of a four wheel vehicle. Thus, each of the rungs 40 of each of the proximal, intermediate and distal units 28, and 32 includes two blade like projections or ridges 110. The height of ridges 110 is sufficiently high to provide traction. The height of ridges 110 is sufficiently low so as not to cause a tearing or cutting of the tires of the four wheel vehicle. The width of ridges 110 is sufficiently thin to provide traction. The width of ridges 110 is sufficiently thick so as to not cause a tearing or cutting of the tires of the four wheel vehicle. Rung 40 is tubular. Rung 40 is one-piece and integral. The plates 102, 104, 106, 108 may be welded together, extruded, or formed in a different manner.

Rung 40 extends from a location immediately adjacent to floor 82 of support members 72, 74, as rung 40 rests on ledge 84 that is an extension of floor 82. Rung 40 is spaced from the curved top 76 of support members 72, 74. By spacing rung 40 from the curved top 76, each of the proximal, intermediate, and distal units 28, 30 and 32 provide a track having depth for the tire of the four wheel vehicle such that, if a tire veers off a longitudinal axis of the units 28, 30 and 32, the tire will hit the inner walls 78 and the tapering curved inner portions of the curved top 76 and then deflect back toward the longitudinal axis of the units 28, 30, 32.

As shown in FIGS. 1A, 1B, 2A, 5A, and 5B, apparatus 10 includes a pair of ramp strap mechanisms or tie-downs 112 for use when apparatus 10 is in the ramp configuration. Ramp strap mechanism 112 extends from the pickup truck 16 to one of the ramps 12, 14. An anchor location on the pickup truck 16 may be a rear bumper 114 or a rear hitch 116. An anchor location on ramp 12 or ramp 14 may include a rung 40 on the distal unit 32 or a rung 40 on the intermediate unit 32 or one or both of the longitudinal supports 72, 74. Such support 72 or 74 or both supports 72, 74 may be on the distal unit 32 or the intermediate unit 30.

Ramp strap mechanism 112 includes a proximal strap 118 and a distal strap 120. Proximal strap 118 and distal strap 120 are interconnected by a buckle 122.

Proximal strap 118 forms a first loop 124. Loop 124 is permanently stitched to proximal strap 118 at a proximal end of proximal strap 118. The distal end of proximal strap 118 is permanently engaged to the buckle 122. Proximal strap 118 is not drawn tight by the buckle 122. Proximal strap 118 is not drawn through the buckle 122.

Distal strap 120 includes two strap sections 126 and 128. One end of distal strap 120 includes a hook 130. The other end of distal strap 120 includes a second loop 132. Strap section 126 extends from the buckle 122 to the hook 130. Strap section 128 extends from the buckle 122 to the second loop 132. The lengths of strap sections 126, 128 change as the second loop 132 is drawn tight so as to draw strap 120 through the self tightening buckle or cinch mechanism 122. As strap 120 is tightened, the length of strap section 128 increases and the length of strap section 126 decreases.

Ramp strap mechanism 112 may be pre-attached to ramp 12 or ramp 14. FIG. 5A shows how ramp strap mechanism 112 is attached to a rung 40 of one of the ramps 12, 14. First, ramp strap mechanism 112 is wound about a rung 40. Then the second loop 132 and the hook 130 are fed through the first loop 124. The second loop 132 and hook 130 then lead the strap sections 126, 128 through the first loop 124. The strap sections 126, 128 then lead the buckle 122 through the first loop 124. Buckle 122 then leads the distal end of strap 118 through the first loop 124. Then the distal end of strap 118 leads a remainder portion of strap 118 through the first loop 124 until strap 118, including a portion of loop 124, forms a third loop 134 about the rung 40.

To secure the ramp 12 or 14 to the pickup truck 16, hook 130 is hooked to the underneath of rear bumper 114, then loop 132 is pulled to tighten strap section 126 through the self-tightening buckle 122. Strap 120 may be loosened by pressing down on a spring loaded tongue 136 of buckle 122.

Figure 6A:
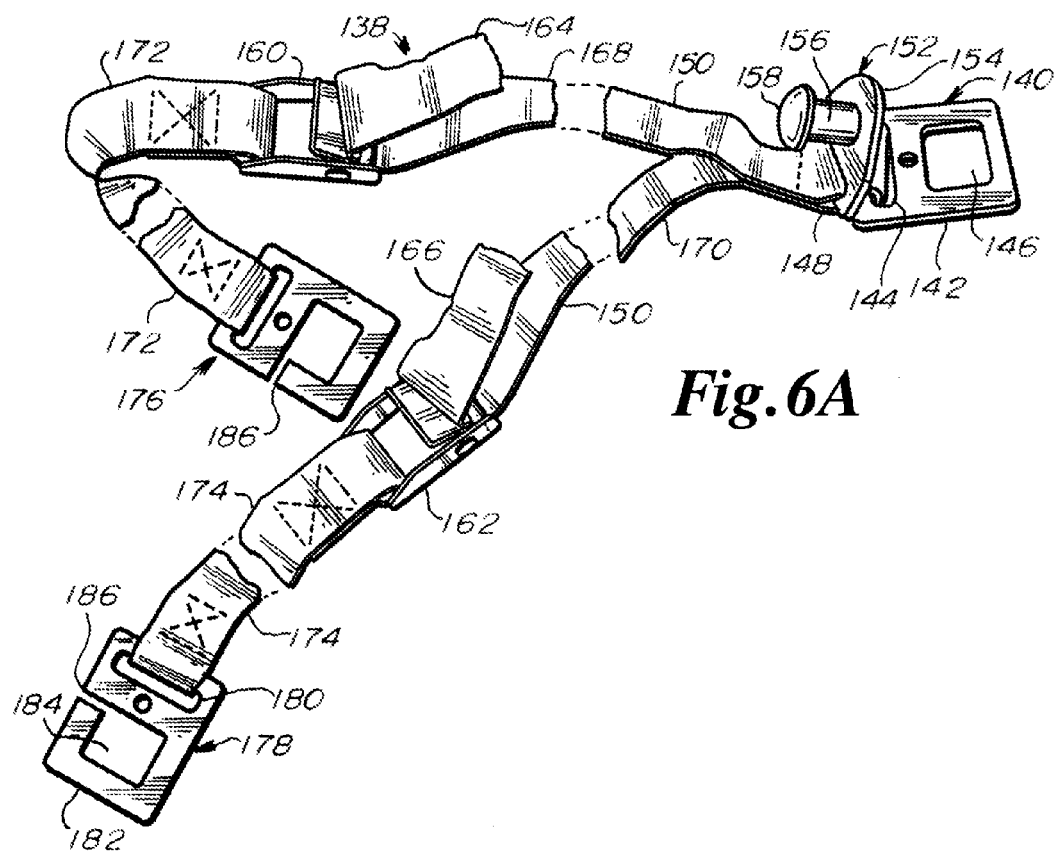
FIG. 6A is a perspective, detail, broken apart view of a strap mechanism for connection to the tailgate connection of the pickup truck.

As shown in FIG. 6A, a strap mechanism or tie-down 138 is used for connection to the tail gate connection. Strap mechanism 138 includes at a lower end a pair of connectors. A first connector 140 includes a plate 142 having a slot 144 formed therein and further having a rectangular opening 146 formed therein. Rectangular opening 146 is a receiver for a connector. Slot 144 receives a looped portion 148 of a strap 150. A second connector 152 is further engaged on the looped portion 148 of strap 150. This second connector 152 includes a plate 154. Extending from the plate 154 is a post 156 that includes a cap 158.

The first connector or connection 140 is used for particular pickup trucks having certain connections or connectors on their tailgates. The second connector or connection 152 is used for different pickup trucks having other certain connections or connectors on their tailgates.

Strap 150 extends from a first buckle or cinch mechanism 160 to the looped portion 148. Then strap 150 extends from the looped portion 148 to a second buckle or cinch mechanism 162. Looped portion 148 is formed by stitching strap 150 back to itself. Each of connectors 140, 152 is slideable on looped portion 148. Strap 150 includes a free end 164 that has been drawn through buckle 160. Strap 150 includes a free end 166 that has been drawn through buckle 162. Free ends 164, 166 can be drawn through buckles 160, 162 to decrease the effective length of strap portions 168, 170 of strap 150. The effective length of strap portions 168, 170 is increased by depressing respective tongues in respective buckles 160, 162 and drawing strap portions 168, 170 back through the buckles 160, 162.

Strap mechanism 138 further includes a pair of second straps 172, 174. Each of the straps 172, 174 includes a proximal end looped about a post or cross member of its respective buckle 160, 162. Each of the straps 172, 174 includes a distal end looped about a cross member of a respective S-shaped connector 176, 178. Each of the S-shaped connectors 176, 178 includes a slot 180 for receiving the distal looped end of its respective strap 172, 174. Each of the S-shaped connectors 176, 178 further includes a hook or strap receiving portion 182. Each of the S-shaped connectors 176, 178 further includes a strap receiving opening 184 and a slot 186 for entry and exit of a portion of a strap into and out of strap receiving opening 184. Each of the S-shaped connectors 176, 178 is flat. Straps 172, 174 are not increased or decreased in length by buckles 160, 162. Strap connectors 176, 178 are looped about a portion of barrier 12 and/or barrier 14 and then engaged to its respective strap 172, 174 or its respective strap portion 168, 170, whereupon the free ends 164, 166 can be drawn through the respective buckles or cinch mechanisms 160, 162 to decrease the effective length of strap mechanism 138 and to thereby tighten strap mechanism 138.

One example of how the strap mechanism 138 is used is shown in FIG. 2B, where barriers 12 and 14 are disposed in a right angle configuration such as shown in FIG. 3B. Another example of how the strap mechanism 138 is used is shown in FIG. 5C, where barriers 12, 14 are disposed in an oblique configuration such as shown in FIG. 3D. Strap mechanism 138 may also be utilized in other ways to secure the barriers 12 and 14 to the pickup truck 16.

Figure 7B:
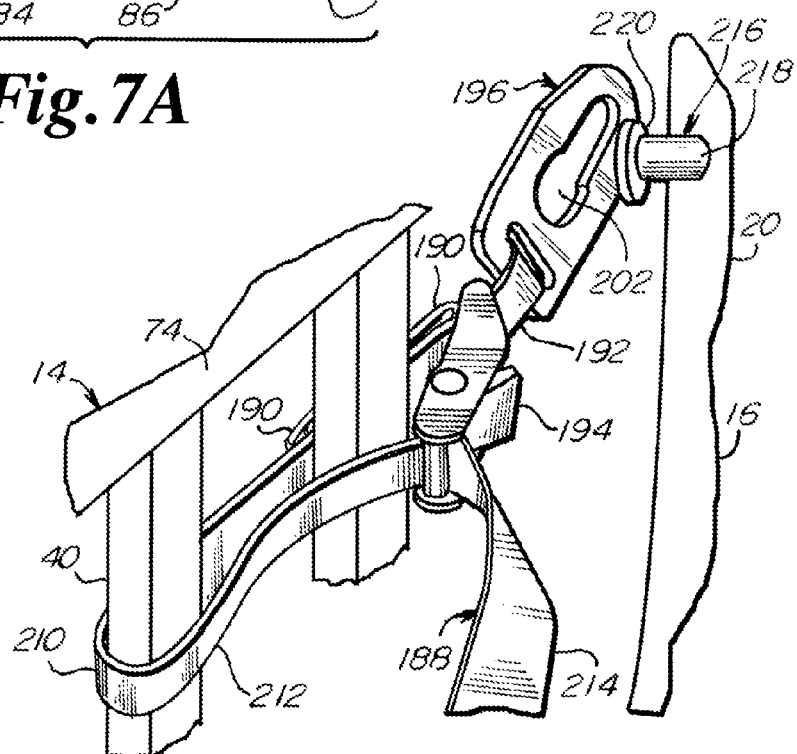
FIG. 7B is a perspective, detail view of a portion of the strap mechanism of FIG. 6B that connects to the wall connection of the pickup truck.
Figure 7C:
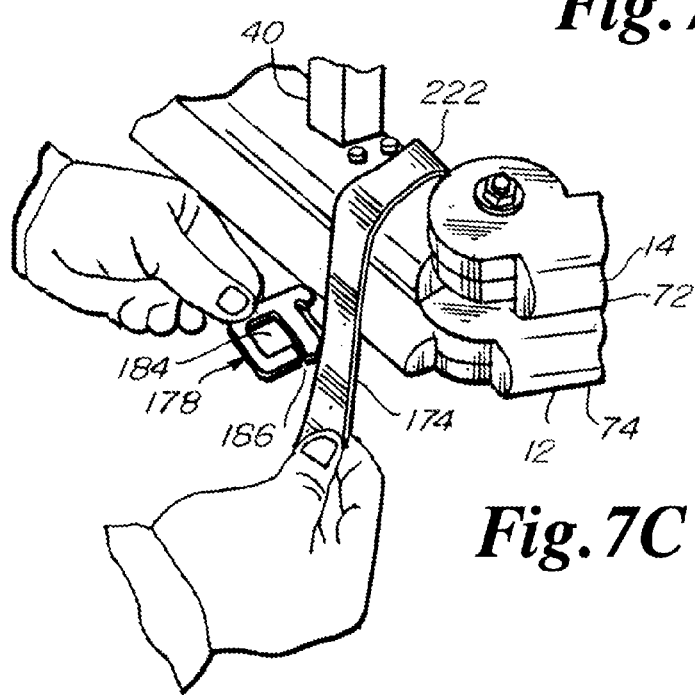
FIG. 7C is a perspective, detail view of a portion of the strap mechanism of FIG. 6A winding about a portion of one of the proximal, intermediate or distal units of the apparatus of FIG. 1A when in the barrier configuration, which strap mechanism is then connected to the tailgate connection of the pickup truck.

In each of FIGS. 2B and 5C, strap mechanism 138 forms loops 222, as shown in FIG. 7C, about the two distal units 32 of the barriers 12, 14. On the other side of the tailgate 22, another strap mechanism 138 is employed about the two proximal units 28 of the barriers 12, 14. Each of the strap mechanisms 138 forms two loops 222. Loops 222 are formed by strap sections 172 and 174. Loops 222 are separated by two rungs 40 in FIG. 2B and three rungs 40 in FIG. 5C. If desired, loops 222 can be separated by zero, one, two, three or more rungs 40. Each of the loops 222 ties together a lower support member 72 of upper barrier 14 and an upper support member 74 of lower barrier 12. Strap mechanisms 138 apply forces to the barriers 12, 14 in a downward direction toward the surface 26 of the tailgate 22. Connector 152 is used in FIG. 2B for the tailgate connection. Connector 140 is used in FIG. 5C for the tailgate connection. Strap mechanism 138 is further shown employed in FIG. 8C.

In each of FIGS. 2B and 5C, strap mechanism 138 forms a V-shape. The V-shape stems from tailgate connection or connector 152 and extends upwardly, with strap sections 170, 174 extending in one direction and with strap sections 168, 172 extending in another direction from connector 152. Strap sections 170, 174 may extend forwardly and upwardly, with the forward component pulling against the horizontal component of strap mechanism 188 that is discussed below. Strap sections 168 and 172 may extend substantially in the vertical direction to exert a downward force on the barriers 12, 14.

Figure 6B:
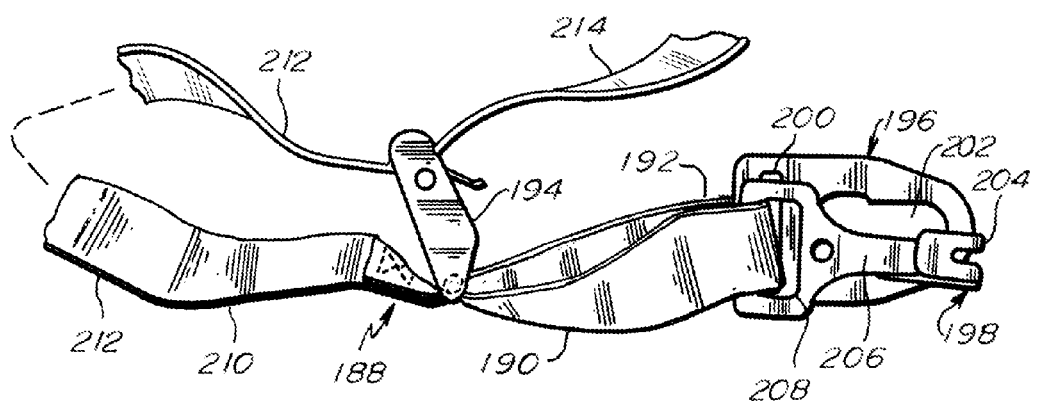
FIG. 6B is a perspective, detail, broken apart view of a strap mechanism for connection to the wall connection of the pickup truck.

A strap mechanism or tie-down 188 is shown in FIG. 6B. Strap mechanism 188 includes a first set or stitched loop 190 and a second set or stitched loop 192. A cross member of a buckle or cinch mechanism 194 slides in loop 190 such that buckle 194 may be slid to and away from the second loop 192. Second loop 192 engages a pair of first and second connectors 196, 198 to the strap mechanism 188. Connector 196 is a flat piece of steel. Connector 196 has a slot 200 formed therein for engagement by strap loop 192. Connector 196 further has a keyhole opening 202 formed therein. Keyhole opening 202 includes a first circular opening communicating with an elongate opening of a lesser width. Connector 198 is a clip that includes a load receiving hook portion 204 and a resilient tongue 206. The resilient tongue is depressed when a connector or connection is engaged by the clip 198. Resilient tongue need not be depressed for engagement of the clip 198. Connector 198 further includes an opening 208 for engagement by second loop 192.

The first connector or connection 196 is used for particular pickup trucks having certain connections or connectors on their walls (that engage the tailgate connections or connectors when the tailgate is upright). The second connector or connection 198 is used for different pickup trucks having other certain connections or connectors on their walls (that engage the tailgate connections or connectors when the tailgate is upright).

Strap mechanism 188 includes a strap 210. Strap 210 is doubled back and stitched to form the first and second loops 190, 192. Strap 210 then includes a main section 212 and a free end 214. Free end 214 is fed through buckle or cinch mechanism 194 to form a loop around a portion of barrier 12 and/or barrier 14. The free end 214 is then further drawn to tighten strap mechanism 188 so as to engage the barrier 12 and/or barrier 14 to the wall connection of the pickup truck 16. Strap mechanism 188 is shown employed in FIGS. 2B, 7B, 8A and 8B. Strap mechanism 188 applies forces to the barriers 12, 14 in a horizontal direction.

FIG. 7B shows a portion of the strap mechanism 188 of FIG. 6B and shows an example of how strap mechanism 188 may be used. Clip or connector 198 of FIG. 6B has been left out of FIG. 7B for clarity. Pickup 16 includes a wall 20 that includes a wall connection 216. Wall connection 216 includes a post 218 and a cap 220 on the post 218. Cap 220 is inserted through the circular portion of the keyhole opening 202 and then the post 218 engages the smaller elongate portion of the keyhole opening 202. Cap 220 then engages the outer surface of the plate of the connector 196. Strap 210 is wound about one or two or three rungs 40, or about any other portion of the upper barrier 14. Then the free end 214 is drawn so as to cinch strap mechanism 188 tightly while connector 196 is engaged to wall connection 216.

FIG. 7C shows a portion of the strap mechanism 138 of FIG. 6A and shows an example of how the portion of the strap mechanism 138 may be used. Strap section 174 of strap mechanism 138 may be wound about longitudinal support member 74 of any of the proximal, intermediate, and distal units 28, 30, 32 of lower barrier 12 and an adjacent section of a longitudinal support member 72 of the respective proximal, intermediate, and distal units 28, 30, 32 of upper barrier 14 to form a loop 222. Then a strap section 174 is inserted through slot 186 and engaged in the opening 184. Then the respective free end 166 is pulled to tighten the loop 222 about barriers 12, 14.

FIG. 8A shows a wall connection 224 for the wall 20 of the pickup truck 16. Wall connection 224 includes a cylindrical cap 226 spaced from a base 228 to create a slot between the cap 226 and the base 228. The cap 226 is on a post 230 fixed to the base 228. The circular portion of keyhole opening 202 of connector 196 is first inserted over the cap 226. Then the connector 196 is slid down to the base 228, whereupon the smaller elongate opening of keyhole opening 202 engages the smaller diameter post 230.

FIG. 8B shows a wall connection 232 for the wall 20 of a pickup truck 16. Wall connection 232 includes a U-shaped connector 234 extending from a base 236 that is engaged to the wall 20. Clip or connector 198 clips to the U-shaped connector 234 with the hook 204 bearing the load of the barriers 12, 14. For clarity, connector 196 is deleted from FIG. 8B.

FIG. 8C shows a tailgate connection 238 of the tailgate 22 of the pickup truck 16. Tailgate connection 238 includes therein a latch mechanism to latch to either one of connector 152 or connector 140 of strap mechanism 138 such that the strap mechanism 138 can pull the barriers 12, 14 down tightly upon the surface 26 of the tailgate 22.

FIG. 8D shows a tailgate connection 240 of a tailgate 22 of a pickup truck 16. The internal latching components of tailgate connection 240 may be different from the internal latching components of tailgate connection 238. Connector 242 includes a plate 244 with a rectangular opening 246. Plate 244 and opening 246 can be a connector for a tailgate connection, such as connection 240, just as connector 140 can be a connection for a tailgate connection. Connector 242 further includes a post 248 having an endless annular slot 250 formed therein. Post 248 includes a cap 252. Post 248, slot 250 and cap 252 form a connector similar to connector 152 and can engage a tailgate connection such as tailgate connection 240.

In operation, apparatus 10 can be set up from a stow configuration. A stow configuration of ramp/barrier 14 is shown in FIG. 3A. Here proximal unit 28 is disposed in a plane that is parallel to the plane defined by intermediate unit 30. Here distal unit 32 is disposed in a plane that is generally parallel to the planes in which intermediate unit 30 and proximal unit 28 lie. Here in the stow configuration it can be seen that the length of each of the proximal and distal units 28 and 32 are less than one-half the length of the intermediate unit 30 such that, even given the bar portion 96, the proximal and distal units 28 and 32 need not be overlapped in the stow configuration. To take the ramp/barrier 14 out of the stow configuration, the proximal and distal units 28 and 32 are swung outwardly, a pivoting action permitted by the junctions 38.

After both of the ramps 12, 14 are swung out to their ramp configurations, the ramps 12 and 14 can be supported by the tailgate 22 of pickup truck 16. The bar portions 96, covered by plastic caps 98, rest on the rearward edge of the tailgate 22. Then strap mechanisms 112 are engaged between the ramps 12, 14 and the rear bumper 114 of the pickup truck 16. Strap mechanisms 112 are shown in FIGS. 1A, 1B, 2A, 5A and 5B. Strap mechanism 112 may be engaged to either of the intermediate or distal units 30, 32. For example, strap mechanism 112 may be engaged to the first rung 40 of the distal unit 32 or to the last rung 40 of the intermediate unit 30. A separate strap mechanism 112 is engaged to each of the ramps 12, 14.

Figure 1B:
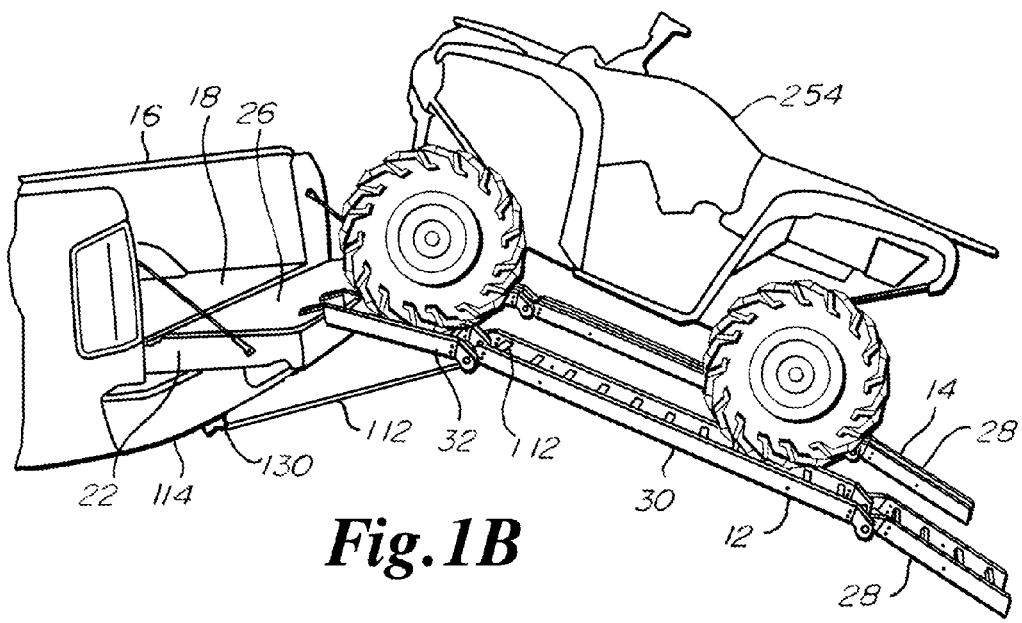
FIG. 1B is a perspective side view of the apparatus of FIG. 1A showing a four wheel vehicle fully on the apparatus in the ramp configuration and shows the three units of each of the ramps in an arched form.

Then a four wheel vehicle 254, such as an all-terrain vehicle, as shown in FIG. 1B, may drive up the apparatus 10 and onto the bed 18 of the pickup truck 16. As the vehicle 254 is driven up the ramps 12, 14, the ramps 12, 14 retain their arched form, as shown in FIG. 1B, such that the proximal, intermediate and distal units 28, 30, 32 remain at oblique angles relative to their adjacent units 28, 30, 32. FIG. 2A shows that a winch cable 256 may be employed to draw the vehicle 254 up the ramps 12, 14.

After the vehicle 254 is on the bed 18 (or the extended bed where the extended bed is the bed 18 plus the tailgate surface 26), the ramps 12, 14 are converted to the barriers 12, 14 and placed upon the tailgate 22 and, depending upon the size of the pickup truck 16, partially on the bed 18. Lower and upper barriers 12, 14 are converted from the ramp configuration shown in FIG. 1A to a barrier configuration, such as the right angle barrier configuration shown in FIGS. 2B and 3B or the oblique barrier configuration shown in FIGS. 3D and 5C, by swinging the proximal and distal units 28 and 32 inwardly.

Then the lower barrier 12 is placed upon the tailgate 22. Then the upper barrier 14 is placed on the lower barrier 12, with the alignment holes 36 receiving the alignment pins 34. Then two strap mechanisms 138 are engaged to the barriers 12, 14 and two strap mechanisms 188 are engaged between the barriers 12, 14 and the pickup truck 16 to fix the apparatus 10 in the barrier configuration on the pickup truck 16.

As shown FIG. 2B, FIG. 4A, and FIG. 4B, the first barrier 12 includes a C-shape at a first time. As shown in FIG. 1A, FIG. 1B, and FIG. 2A, the first barrier 12 includes a ramp shape at a second time. As shown in FIG. 2B, FIG. 3B, FIG. 3D, FIG. 4A, and FIG. 4B, the second barrier 14 includes a C-shape at a first time. As shown in FIG. 1A, FIG. 1B, and FIG. 2A, the second barrier 14 includes a ramp shape at a second time. As shown in FIG. 3A, the second barrier 14 includes at a third time a folded compact form and shows a proximal end unit 28, an intermediate unit 30 and a distal end unit 32. As described above in this specification, ramp/barrier 12 also includes a proximal end unit 28, an intermediate unit 30 and a distal end unit 32 such that the first barrier 12 also includes at a third time a folded compact form.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A pickup truck bed extender for a pickup truck, the pickup truck having a bed, a tailgate, and two opposing walls, the tailgate having first connectors, the opposing walls having second connectors that engage the first connectors to engage the tailgate to the opposing walls, the pickup truck bed extender comprising:
   a) a first barrier comprising at least three first units, said at least three first units comprising proximal, intermediate and distal units, said intermediate first unit being pivotally engaged to each of the proximal and distal units, each of the first units being disposed in a plane, each of the first units comprising a length, a width, a height, a top, a bottom, a first face, a second face, a first end, and a second end, the height of the first unit being defined by a distance from said top to said bottom, the width of the first unit being defined by a distance from said first face to said second face, a length of the first unit being defined as a distance from said first end to said second end, the first barrier comprising a C-shape at a first time and a ramp shape at a second time;
   b) a second barrier comprising at least three second units, said at least three second units comprising proximal, intermediate and distal units, said intermediate second unit being pivotally engaged to each of the proximal and distal units, each of the second units being disposed in a plane, each of the second units comprising a length, a width, a height, a top, a bottom, a first face, a second face, a first end, and a second end, the height of the second unit being defined by a distance from said top to said bottom, the width of the second unit being defined by a distance from said first face to said second face, a length of the second unit being defined as a distance from said first end to said second end, the second barrier comprising a C-shape at a first time and a ramp shape at a second time;
   c) the first and second barriers being engagable to each other such that said proximal units are disposable in a common plane, such that said intermediate units are disposable in a common plane, such that said distal units are disposable in a common plane, such that the bottom of one proximal unit is engaged to the top of the other proximal unit, such that the bottom of one intermediate unit is engaged to the top of the other intermediate unit, and such that the bottom of one distal unit is engaged to the top of the other distal unit;
   d) at least one of the first and second barriers when engaged to each other being further engaged to at least one of the first and second connectors to engage the first and second barriers to the pickup truck;
   e) the first and second barriers when engaged to each other and when in said C-shape being disposable at least partially on said tailgate such that the bed of the pickup truck is extended, the proximal and distal units of the first and second barriers being adjacent to the opposing walls of the pickup truck and being disposed forwardly of the intermediate units of the first and second barriers, the intermediate units crossing between the proximal and distal units to replace the tailgate that lays flat; and
   f) wherein each of the units of each of the first and second barriers includes a pair of first and second longitudinally extending support members and a set of cross members extending between said longitudinally extending support members, and further comprising a first pair of first and second junctions between said proximal unit and said intermediate unit, and a second pair of first and second junctions between said intermediate unit and said distal unit, with each of said junctions comprising a pair of external stops, the proximal and intermediate units being disposed at a first angle relative to each other when the external stops make contact with each other and prevent further pivoting of the proximal and intermediate units in the ramp configuration, and the intermediate and distal units being disposed at a second angle relative to each other when the external stops make contact with each other and prevent further pivoting of the intermediate units in the ramp configuration, and the external stops being visible to the naked eye when the pickup bed extender is in the ramp configuration.

2. The pickup bed extender of claim 1, wherein each of said at least three first and second units of each of the first and second barriers includes through spaces running from said first face to said second face to permit air to pass through the first and second barriers to minimize wind resistance when the pickup truck is being driven.

3. The pickup bed extender of claim 1, wherein each of the first and second barriers comprises at said first time said C-shape where said proximal and distal units oppose each other, and wherein each of the first and second barriers comprises at said second time said ramp shape, said ramp shape being a shape where an angle between said proximal and intermediate units is present and where an angle between said intermediate and distal units is present such that said ramp shape comprises an arched form.

4. The pickup bed extender of claim 1, wherein each of the first and second barriers comprises at said first time said C-shape where said proximal and distal units oppose each other and run obliquely relative to said intermediate unit, and wherein each of the first and second barriers comprises at said second time said ramp shape, said ramp shape being a shape where an angle between said proximal and intermediate units is present and where an angle between said intermediate and distal units is present such that said ramp shape comprises an arched form.

5. The pickup bed extender of claim 1, wherein each of the first and second barriers comprises at said first time said C-shape where said proximal and distal units oppose each other and run at a right angle relative to said intermediate unit, and wherein each of the first and second barriers comprises at said second time said ramp shape, said ramp shape being a shape where an angle between said proximal and intermediate units is present and where an angle between said intermediate and distal units is present such that said ramp shape comprises an arched form.

6. The pickup bed extender of claim 1, wherein each of the first and second barriers comprises at a third time a folded compact form, the folded compact form being a form where a face of the proximal unit lays adjacent to a face of the intermediate unit, where a face of the distal unit lays adjacent to a face of the intermediate unit, and where a free end of the proximal unit opposes a free end of the distal unit.

7. The pickup bed extender of claim 1, wherein one of the first and second barriers includes a male component and wherein the other of the first and second barriers includes a female component, the male component engaging the female component when the bottoms of the units of one of the first and second barriers engage the tops of the units of the other of the first and second barriers.

8. The pickup bed extender of claim 7, wherein each of the units of each of the first and second barriers includes one of said male component and female component.

9. The pickup bed extender of claim 1, wherein each of the units of each of the first and second barriers includes a pair of longitudinally extending support members and a set of cross members extending between said longitudinally extending support members, the cross members extending horizontally when the bed extender is employed in a ramp configuration, the cross members extending vertically when the bed extender is employed in a barrier configuration, and each of the cross members being vertically aligned with another cross member of another unit when the bed extender is employed in a barrier configuration.

10. The pickup bed extender of claim 1, wherein at least one of the first and second barriers is engaged to one of the first and second connectors by a first strap, wherein at least one of the first and second barriers is engaged another of the first and second connectors by a second strap, wherein at least one of the first and second barriers is engaged to still another of the first and second connectors by a third strap, and wherein at least one of the first and second barriers is engaged to yet another of the first and second connectors by a fourth strap.

11. The pickup bed extender of claim 1, wherein at least one of the first and second barriers is engaged to the first connector by a first strap, the first strap having a first connection that engages the first connector of said pickup truck, the first strap having a second connection that does not engage the first connector of said pickup truck, said second connection engaging a first connector of another pickup truck, the first and second connections being adjacent to each other.

12. The pickup bed extender of claim 1, wherein at least one of the first and second barriers is engaged to the second connector by a first strap, the first strap having a first connection that engages the second connector of said pickup truck, the first strap having a second connection that does not engage the second connector of said pickup truck, said second connection engaging a second connector of another pickup truck, the first and second connections being adjacent to each other.

13. The pickup bed extender of claim 1, wherein at least one of the first and second barriers is engaged to said first connector by a strap mechanism, the strap mechanism including two strap sections that form a V-shape, the V-shape stemming from the first connector and extending to different portions of the first and second barriers.

14. The pickup bed extender of claim 1, wherein each of the first and second angles is in the range between about 5 and about 20 degrees when the pickup bed extender is in the ramp configuration having no load.

15. The pickup bed extender of claim 1, wherein said range is between about 7 and about 17 degrees.

* * * * *